(12) United States Patent
Lu et al.

(10) Patent No.: US 12,402,186 B2
(45) Date of Patent: Aug. 26, 2025

(54) AUTHENTICATOR AND COMMUNICATION METHOD THEREFOR

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 322 days.

(21) Appl. No.: 18/034,684

(22) PCT Filed: Nov. 4, 2021

(86) PCT No.: PCT/CN2021/128651
§ 371 (c)(1),
(2) Date: Apr. 29, 2023

(87) PCT Pub. No.: WO2022/142718
PCT Pub. Date: Jul. 7, 2022

(65) Prior Publication Data
US 2023/0403749 A1   Dec. 14, 2023

(30) Foreign Application Priority Data
Dec. 31, 2020 (CN) .......................... 202011619762.1

(51) Int. Cl.
| H04W 12/06 | (2021.01) |
| H04L 9/08 | (2006.01) |
| H04W 76/14 | (2018.01) |

(52) U.S. Cl.
CPC .......... H04W 76/14 (2018.02); H04L 9/0825 (2013.01); H04L 9/0869 (2013.01)

(58) Field of Classification Search
CPC ......... H04W 8/26; H04W 8/005; H04W 8/24; H04W 76/14; H04W 4/80; H04W 84/20;
(Continued)

(56) References Cited

U.S. PATENT DOCUMENTS 9,780,954 B2   10/2017   Bhattacharya et al.
12,041,169 B2 *   7/2024   Jung ........................ H04L 9/14
(Continued)

*Primary Examiner* — Cindy Trandai
(74) *Attorney, Agent, or Firm* — J. Clinton Wimbish; Maynard Nexsen PC

(57) ABSTRACT

A communication method for an authenticator, the method comprising: an authenticator is powered on, and enters a connection mode; broadcast data is scanned, a first client identifier in the broadcast data is acquired, and a first key is acquired to verify the first client identifier; if verification is successful, a second authenticator identifier and a second session key are generated, notification is carried out for the successful verification of the first client identifier, scanning is stopped, and broadcast data that comprises the second authenticator identifier is broadcasted; the authenticator receives a request to establish a Bluetooth connection sent by a client, establishes a Bluetooth connection with the client, and performs handshake and encrypted communication operations with the client. According to the present invention, the data in a transmission process is guaranteed to not get stolen, so the data security in the transmission process is improved, and the benefit to the user is thus ensured.

18 Claims, 4 Drawing Sheets

(58) Field of Classification Search
CPC .............. H04W 12/50; H04W 12/041; H04W 12/0471; H04W 12/61; H04W 12/63; H04W 12/0431; H04W 4/70; H04W 76/23; H04W 12/02; H04W 12/06; H04L 2101/681; H04L 9/0825; H04L 9/0869; H04L 9/0637; H04L 9/3271; H04L 2209/80; H04M 1/6066; H04M 2250/02
See application file for complete search history.

(56) References Cited

U.S. PATENT DOCUMENTS

| | | | | |
|---|---|---|---|---|
| 2015/0372811 | A1* | 12/2015 | Le Saint | H04L 63/068 |
| | | | | 705/76 |
| 2017/0359717 | A1* | 12/2017 | Adler | H04W 12/42 |
| 2018/0317071 | A1* | 11/2018 | Rabii | H04W 12/50 |
| 2018/0349242 | A1* | 12/2018 | Mathews | H04W 12/37 |
| 2019/0159030 | A1* | 5/2019 | Lim | H04L 9/3226 |
| 2020/0322788 | A1* | 10/2020 | Batra | H04W 8/24 |
| 2020/0382569 | A1* | 12/2020 | Fornshell | H04M 1/6066 |
| 2020/0394332 | A1* | 12/2020 | Jakobsson | G06F 16/24573 |
| 2021/0014226 | A1* | 1/2021 | Zhao | H04L 9/50 |
| 2022/0191700 | A1* | 6/2022 | Jung | H04L 9/3242 |

* cited by examiner

AUTHENTICATOR AND COMMUNICATION METHOD THEREFOR

TECHNICAL FIELD

The present invention relates to an authenticator and a method for making communication with the authenticator, which belongs to communication technology field.

PRIOR ART

In prior art, standard Bluetooth adapts system level pairing, i.e. a Bluetooth device paring with another Bluetooth device. That kind of pairing has following shortcomings: at one aspect, all applications on one device can use data transferred by another Bluetooth device after pairing, which leads to unsafe data; at another aspect, it is unfriendly to application UI, a slave device is completely to be connected passively in connecting process, no master device can be chosen; In addition, communication performed in some connecting processes among Bluetooth devices requires no pairing at all. Those connecting processes will lead to that sensitive data might be stolen and low security.

SUMMARY OF THE INVENTION

The object of the present invention is to provide an authenticator and a communicating method thereof, which can assure that data will not be stolen in transmitting process and data security is improved in transmitting process.

Thus, according to one aspect of the present invention, a communicating method of an authenticator is provided. The method includes the following Steps:

S1) the authenticator powers up and enters connecting mode;

S2) the authenticator scans broadcast data, obtains a first client identification in the broadcast data, obtains a first key stored by the authenticator, verifies the first client identification according to the first key, if verifying is successful, execute Step S3; if verifying is failed, rescan broadcast data;

S3) the authenticator generates a second authenticator identification according to the first key; obtains a second key corresponding to the first key, generates a second session key according to the second key, notifies that verifying the first client identification is successful, stops scanning and broadcasts broadcast data including the second authenticator identification;

S4) the authenticator receives a request for building Bluetooth connection sent from the client, builds Bluetooth connection with the client, waits for receiving a handshake command sent from the client, when the handshake command is received, execute Step S5;

S5) the authenticator obtains a second handshake key by performing operation via the second session key, obtains client data and a client data digest value in the handshake command, verifies the client data according to the second handshake key, the client data and the client data digest value, if verifying is successful, the authenticator performs operation on authenticator data via the second handshake key to obtain an authenticator data digest value, sends a handshake response including the authenticator data and the authenticator data digest value to the client;

S6) the authenticator waits for receiving an operating command sent from the client, when the operating command is received, execute Step S7; and S7) the authenticator obtains cipher data in the operating command, performs operation via the second session key to obtain a second encrypting key, decrypts the cipher data via the second encrypting key to obtain operating data, performs corresponding operation according to the operating data to obtain operating result data, performs operation on the operating result data via the second encrypting key to obtain operating response data, sends an operating response including the operating response data to the client.

According to another aspect of the present invention, an authenticator is provided. The authenticator includes:

a powering and processing module configured to power up and enter connecting mode;

a scanning module configured to scan broadcast data and obtain a first client identification in the broadcast data;

an obtaining module configured to obtain a first key stored by the obtaining module;

a first verifying module configured to verify the first client identification according to a first key;

a first generating module configured to generate a second authenticator identification according to the first key;

the obtaining module further configured to obtain a second key corresponding to the first key;

a second generating module configured to generate a second session key according to the second key;

a notifying module configured to notify that verifying the first client identification is successful;

a broadcasting module configured to stop scanning and broadcast the broadcast data comprising the second authenticator identification;

the obtaining module further configured to obtain client data and a client data digest value according to a handshake command;

a third generating module configured to perform operation via the second session key to obtain a second handshake key;

a second verifying module configured to verify the client data according to the second handshake key, the client data and the client data digest value;

a fourth generating module configured to perform operation on authenticator data via the second handshake key to obtain an authenticator data digest value;

a sending module configured to send a handshake response including the authenticator data and the authenticator data digest value to the client;

the obtaining module further configured to obtain cipher data in an operating command;

a fifth generating module configured to perform operation via the second session key to obtain a second encrypting key;

a decrypting and processing module configured to decrypt the cipher data via the second encrypting key to obtain operating data, perform corresponding operation according to the operating data to obtain operating result data, perform operation on the operating result data via the second encrypting key to obtain operating response data;

and the second sending module further configured to send an operating response including operating response data to the client.

According to the present invention, based on a Bluetooth connection among those devices, the client and the authenticator build a Bluetooth pairing connection at application level, perform a bidirectional broadcast and scanning authentication in connecting process; an encrypting key is generated according to a session key after successful authentication and connection; data in communicating process is encrypted and transferred in communicating process via the encrypting key which assures that data during any data transferring process will not be stolen. By adapting the method provided by the present invention, data security is improved in transferring process and benefit of users is assured.

DESCRIPTION OF EMBODIMENTS

The embodiments of the present disclosure will be clearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without inventive efforts are within the scope of the present disclosure.

Embodiment 1

Embodiment 1 provides a communicating method of an authenticator, which is adapted to a system including a client and an authenticator. The client is an application installed on a mobile terminal with Bluetooth function and the authenticator has Bluetooth function.

Figure 1:
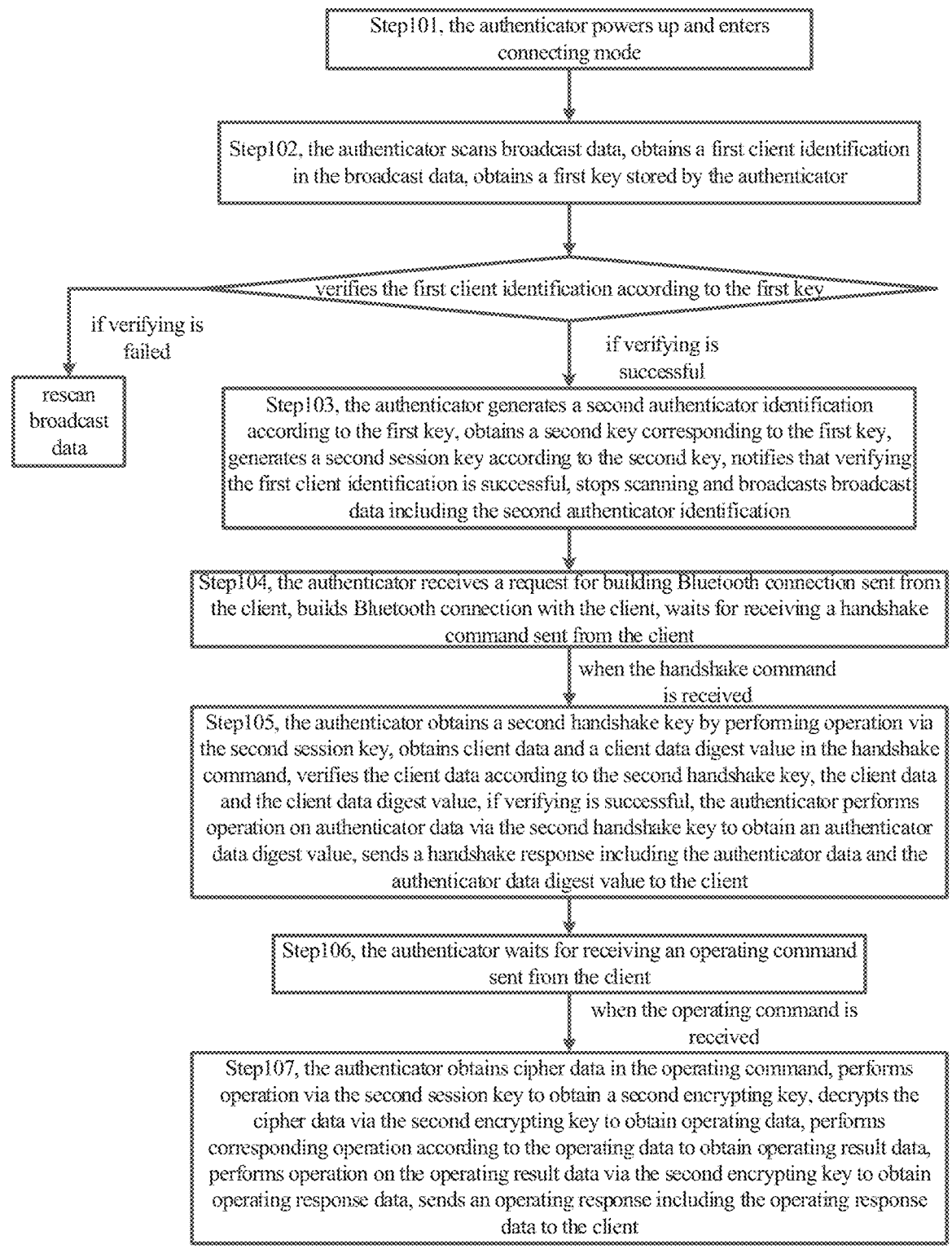
FIG. 1 presents a flow chart of a communicating method of an authenticator provided in Embodiment 1 of the present invention.

As shown in FIG. 1, the method includes the following steps.

Step 101, the authenticator powers up and enters a connecting mode.

Step 102, the authenticator scans broadcast data, obtains a first client identification in the broadcast data, obtains a first key stored by the authenticator, verifies the first client identification according to the first key, if verifying is successful, execute Step 103; if verifying is failed, rescan broadcast data.

Step 103, the authenticator generates a second authenticator identification according to the first key, obtains a second key corresponding to the first key, generates a second session key according to the second key, notifies that verifying the first client identification is successful, stops scanning and broadcasts broadcast data including the second authenticator identification.

Step 104, the authenticator receives a request for building Bluetooth connection sent from the client, builds Bluetooth connection with the client, waits for receiving a handshake command sent from the client, when the handshake command is received, execute Step 105.

Step 105, the authenticator obtains a second handshake key by performing operation via the second session key, obtains client data and a client data digest value in the handshake command, verifies the client data according to the second handshake key, the client data and the client data digest value, if verifying is successful, the authenticator performs operation on authenticator data via the second handshake key to obtain an authenticator data digest value, sends a handshake response including the authenticator data and the authenticator data digest value to the client.

Step 106, the authenticator waits for receiving an operating command sent from the client, when the operating command is received, execute Step 107.

Step 107, the authenticator obtains cipher data in the operating command, performs operation via the second session key to obtain a second encrypting key, decrypts the cipher data via the second encrypting key to obtain operating data, performs corresponding operation according to the operating data to obtain operating result data, performs operation on the operating result data via the second encrypting key to obtain operating response data, sends an operating response including the operating response data to the client.

Preferably, in Embodiment 1, before entering connecting mode, the method further includes: the authenticator determines activating mode, when the activating mode is a first mode, the authenticator enters the connecting mode; when the activating mode is a second mode, the authenticator enters a pairing mode.

For entering the pairing mode, the method further includes:

Step a1) the authenticator receives a extension register command sent from the client, obtains client public key and a client version number in the extension register command, generates an authenticator key pair, generates a first parameter according to the client public key and authenticator private key of the authenticator key pair;

Step a2) the authenticator obtains a first preset data stored by the authenticator, generates initial pairing key according to the client public key, authenticator public key of the authenticator key pair, the client version number, the first preset data and the first parameter, splits the initial pairing key to obtain a first key and a second key, stores the first key and the second key correspondingly; and Step a3) the authenticator sends an extension register response to the client, the extension register response including the authenticator public key and the client version number, the authenticator enters connecting mode.

Preferably, in Embodiment 1, before entering pairing mode, the method further includes: the authenticator the mobile terminal on which the client is build Bluetooth connection with each other.

Specifically, in Step a3, before entering connecting mode, the method further includes: disconnecting Bluetooth connection.

Preferably, in Embodiment 1, verifying the obtained client identification according to the first key specifically is: the authenticator obtains a first preset field stored by the authenticator, a first random number and a first data in the first client identification, performs operation on the first preset field and the first random number via the first key according to a fourth preset algorithm to obtain a second data, determines whether the second data and the first data are identical, if yes, verifying is successful: otherwise, verifying is failed.

Preferably, in Embodiment 1 the authenticator generates a second authenticator identification according to the first key specifically is: the authenticator obtains a second preset field stored by the authenticator, concatenates the first client identification and the second preset field orderly, performs operation on the first client identification and the second preset field via the first key according to the fourth preset algorithm to obtain a fourth data, takes a preset byte in the fourth data as the second authenticator identification.

Preferably, in Embodiment 1, generating a second session key according to the second key specifically is: the authenticator obtains a first preset data stored by the authenticator and the first random number in the first client identification, performs operation on the first random number and the first preset data via the second key according to a third preset algorithm to obtain a second session key.

Preferably, in Embodiment 1 the authenticator performs operation via the second session key to obtain a second handshake key specifically is: the authenticator obtains a second random number and a second preset data stored by the authenticator, performs operation on the second random number and the second preset data via the second session key according to the third preset algorithm to obtain a second handshake key.

Preferably, in Embodiment 1, notifying that verifying the first client identification is successful and stopping scanning and broadcasting broadcast data including the second authenticator identification in Step 103 specifically is: the authenticator sends a request for building Bluetooth connection to the client, builds Bluetooth connection with the client, when the Bluetooth connection is disconnected, the authenticator broadcasts broadcast data including the second authenticator identification.

Preferably, in Embodiment 1, after the authenticator and the client builds Bluetooth connection, the method further includes: the authenticator sends a first unique identification address to the client and receives a second unique identification address sent from the client:

In this case, the broadcast data further includes the first unique identification address and the second unique identification address.

Preferably, in Embodiment 1, in Step 103, notifying that verifying the first client identification is successful specifically includes: the authenticator prompts a user to switch state of the client from broadcast state to scanning state via a prompting module.

Embodiment 2

Embodiment 2 provides a communicating method of an authenticator, which is adapted to a system including a client and an authenticator. The client is an application installed on a mobile terminal with Bluetooth function and the authenticator has a Bluetooth function.

Figure 2:
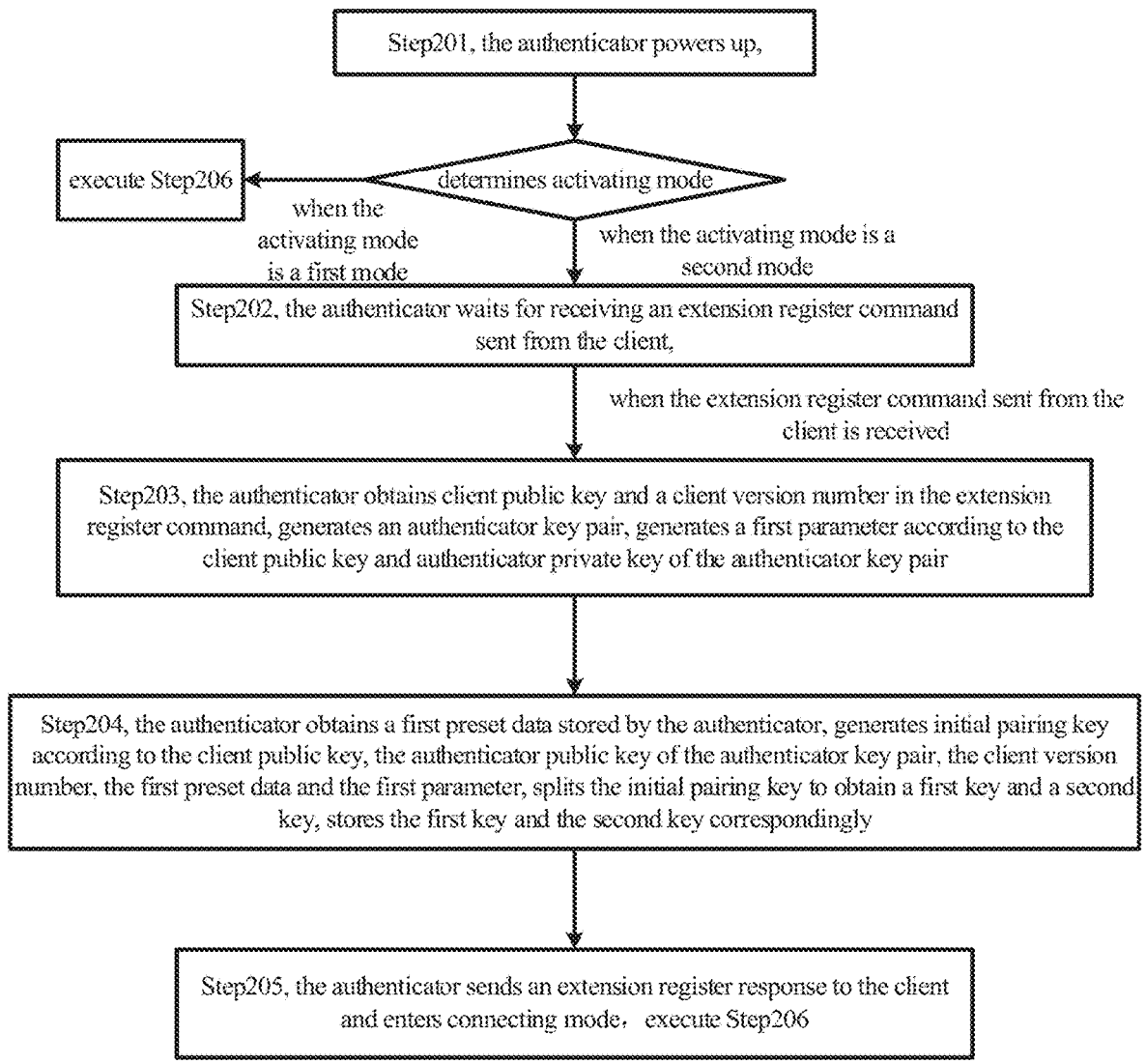
FIG. 2 and FIG. 3 present a flow chart of a communicating method of an authenticator provided in Embodiment 2 of the present invention.
Figure 3:
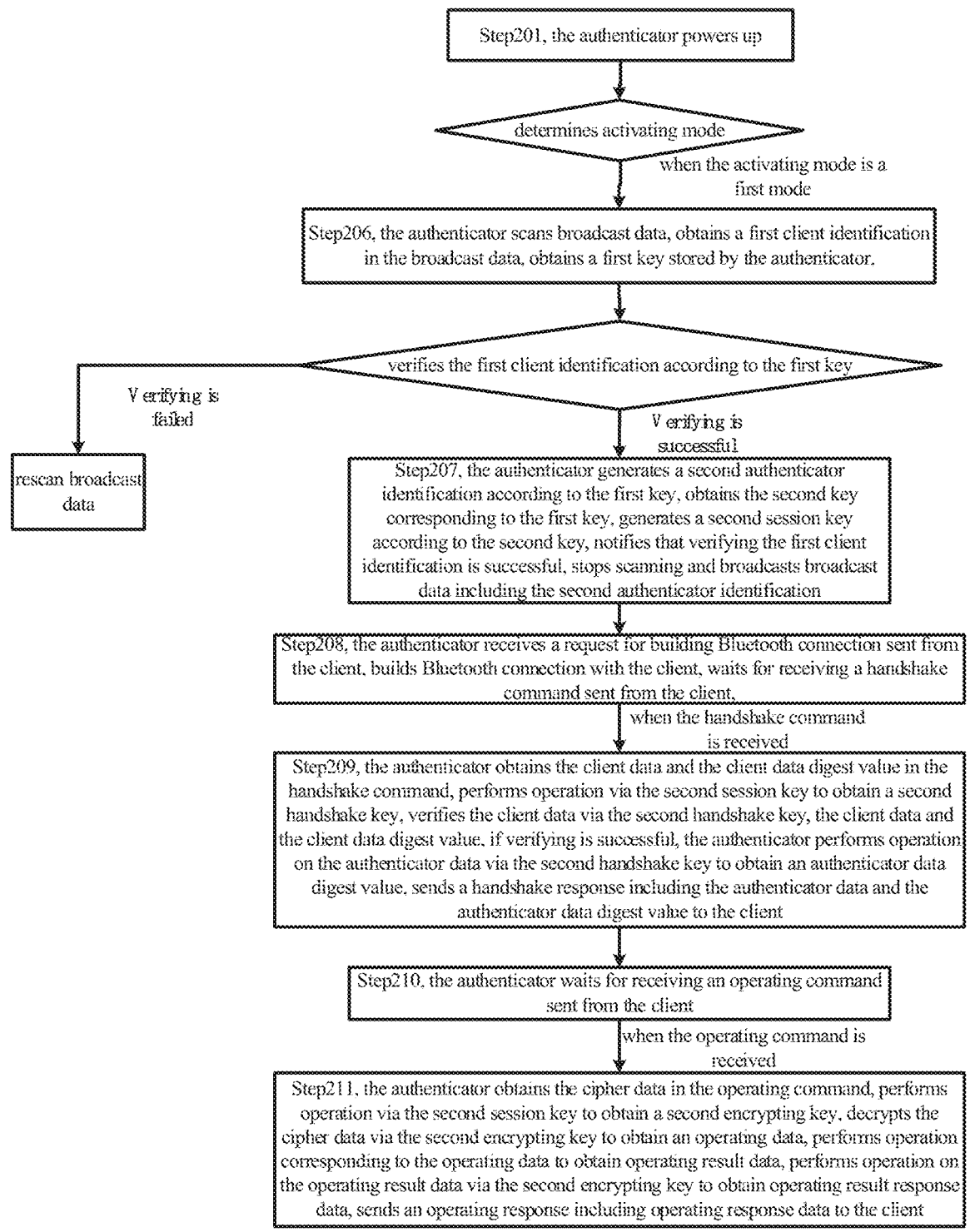

As shown in FIG. 2 and FIG. 3, the method includes the following step.

Step 201, the authenticator powers up, determines activating mode, when the activating mode is a second mode, the authenticator enters pairing mode, execute Step 202; when the activating mode is a first mode, the authenticator enters connecting mode, execute Step 206.

In Embodiment 2, that the authenticator powers up specifically is: when a press key of the authenticator is pressed down by a user the authenticator powers up.

In this case, the activating mode specifically is a type of press key triggering.

Specifically, determining activating mode specifically is: the authenticator determines type of press key, if the type of press key is a first type, the authenticator enters a connecting mode; if the type of press key is a second type, the authenticator enters a pairing mode.

Specifically, the type of press key includes short time pressing key and long time pressing key; in this case, the short time pressing key is a first type, the long time pressing key is a second type.

More specifically, the authenticator determines type of press key specifically is: the authenticator determines type of press key according to a key pressing time period threshold value and time period for pressing and holding the press key, if time period for pressing and holding the press key overpasses the key pressing time period threshold value, the type of the press key is long time pressing key; if time period for pressing and holding the press key does not overpass the key pressing time period threshold value, the type of the press key is short time pressing key.

Step 202, the authenticator waits for receiving an extension register command sent from the client, when the extension register command sent from the client is received, execute Step 203.

In Embodiment 2, Step 202 further includes: the authenticator determines whether the received command is an extension register command, if yes, execute Step 203; otherwise, no processing is performed.

In Embodiment 2, before Step 202, the method further includes: the authenticator and the mobile terminal on which the client is build Bluetooth connection between devices.

In Embodiment 2, the extension register command received by the authenticator is data which meets standard Bluetooth protocol, specifically, the command is transmitted by the client via a Bluetooth connecting transmission layer which are built between the mobile terminal on which the client is and the authenticator.

For example, the extension register command specifically is:

--- dictionary CableRegistrationData {
required sequence<long> versions; required BufferSource rpPublicKey;
}.

---

Step 203, the authenticator obtains client public key and a client version number in the extension register command, generates an authenticator key pair, generates a first parameter according to the client public key and authenticator private key of the authenticator key pair.

In Embodiment 2, generating a first parameter according to the client public key and authenticator private key of the authenticator key pair specifically is: the authenticator generates a first parameter according to the client public key and authenticator private key of the authenticator key pair and a second preset algorithm.

In Embodiment 2, the authenticator generates an authenticator key pair specifically is: the authenticator generates an authenticator key pair according to a first preset algorithm; the authenticator key pair includes an authenticator private key and an authenticator public key.

In this case, the first preset algorithm specifically is algorithm for generating key pair; the authenticator and the client uses a same algorithm for generating key pair.

In this case, the second preset algorithm can be ECDH algorithm.

Specifically, the authenticator generates a first parameter according to the client public key and authenticator private key of the authenticator key pair and a second preset algorithm specifically is: the authenticator multiplies the authenticator private key with the client public key to obtain a product result, takes the first 32 bytes of the product result as the first parameter.

For example, the client public key is:
5F164D70138A35F67FAAEF38E7D4A8C9249A6C88
30A4A46C9844B617E9AD
15AD3E2BC019CB3984A24AB2173033C9615F
BD58542739957227510060CA97F1A2 E7;
the client version number is: "00000001";
the first preset algorithm is: ECC-256;
the authenticator public key is:
CCF146DD3FF87173845A576973664EB2BB80861
CA10A656ADC526B4075FA
06EE52B4A7C65B12CA572441D2354B08E8172
BC296925ADEF8E898BCD5FA11894 67B;
the authenticator private key is:
4C5CD1D426794EB72CBE05D83B9799E48161D
7FBFDE4D6B2FFB76A9662C 5CFC5;
the authenticator multiplies the authenticator private key with the client public key to obtain a product result which is:
8BD9B24EE678018E1CC6C487A55FF3774765
F8AB2AF43BDD101F03E17218
1D1718D86A26245A9808CA09E3048497939
D1F314825660DCB14DBEF1F0F6EE619 B9;
the first parameter is:
8BD9B24EE678018E1CC6C487A55FF3774765F
8AB2AF43BDD101F03E17218 1D17.

Step 204, the authenticator obtains a first preset data stored by the authenticator, generates an initial pairing key according to the client public key, the authenticator public key of the authenticator key pair, the client version number, the first preset data and the first parameter, splits the initial pairing key to obtain a first key and a second key, stores the first key and the second key correspondingly.

In Embodiment 2, generating initial pairing key according to the client public key, the authenticator public key of the authenticator key pair, the client version number, the first preset data and the first parameter specifically is: the authenticator generates initial pairing key according to the client public key, the authenticator public key of the authenticator key pair, the client version number, the first preset data and the first parameter according to a third preset algorithm.

In Embodiment 2, the authenticator generates initial pairing key according to the client public key, the authenticator public key of the authenticator key pair, the client version number, the first preset data and the first parameter according to a third preset algorithm specifically is: the authenticator obtains a first preset data, concatenates the client version number, the client public key and the authenticator public key orderly and performs hash digest operation on concatenated result to obtain a salt value, takes the first parameter as key to perform operation on the salt value and the first preset data according to a third preset algorithm to obtain initial pairing key.

In Embodiment 2, the method further includes: the authenticator stores the first key and the second key correspondingly in an initial pairing key list.

In this case, the length of the obtained initial pairing key is 32 bytes, the first 16 bytes of the obtained initial pairing key is taken as the first key, the last 16 bytes of the obtained initial pairing key is taken as the second key.

For example, the first preset data is ASCII character string "FIDO caBLE v1 pairing data";
the third preset algorithm is: (HKDF-SHA-256);
the authenticator concatenates the client version number, the client public key and authenticator public key orderly to obtain a concatenated result which is:
000000015F164D70138A35F67FAAEF38E7D4A-
8C9249A6C8830A4A46C9844B
617E9AD15AD3E2BC019CB3984A24AB217
3033C9615FBD58542739957227510060C
A97F1A2E7CCF146DD3FF87173845A5769
73664EB2BB80861CA10A656ADC526B40
189467B;
takes the first parameter as key to perform operation on the salt value and the first preset data according to a third preset algorithm to obtain initial pairing key which is:
8BD9B24EE678018E1CC6C487A55FF377476-
5F8AB2AF43BDD101F03E17218 1D17;
splits the initial pairing key to obtain a first key which is:
039A77D14CD5077E9DEA7C5B344E1CB35-
A50433540E55792A2D64BE31571 E883;
splits the initial pairing key to obtain a second key which is:
B66209F7436B16AD3CA177970A266E89A39
64B4DEFC9FB9A15665CC1C603 1087.

Step 205, the authenticator sends an extension register response to the client and enters connecting mode, execute Step 206.

In Embodiment 2, the authenticator sends an extension register response, which includes the authenticator public key and the client version number, to the client.

For example, the extension register response sent to the client specifically is:

```
CableRegistration = {
    version: int,
    maxVersion: int,
    authenticatorPublicKey: bytes,
}.
```

In Embodiment 2, before entering connecting mode, the method further includes: disconnecting Bluetooth connection between devices.

Step 206, the authenticator scans broadcast data, obtains a first client identification in the broadcast data, obtains a first key stored by the authenticator, verifies the first client identification according to the first key, if verifying is successful, execute Step 207; if verifying is failed, rescan broadcast data.

In Embodiment 2, before executing Step 206, the method further includes: the authenticator activates scanning.

Preferably, in Embodiment 2, verifying the client identification according to the first key specifically is: the authenticator obtains a first preset field stored by the authenticator, a first random number and a first data in the first client identification, performs operation on the first preset filed and the first random number via the first key according to the fourth preset algorithm to obtain a second data, determines whether the second data and the first data are identical, if yes, verifying is successful; otherwise, verifying is failed.

Specifically, he authenticator obtains a first preset field stored by the authenticator, a first random number and a first data in the first client identification, performs operation on the first preset filed and the first random number via the first key according to the fourth preset algorithm to obtain a second data, determines whether the second data and the first data are identical specifically is: the authenticator takes the first 8 bytes of the first client identification as a first random number, takes the last 8 bytes of the first client identification as a first data, performs operation on the first preset field and the first random number via the first key according to a fourth preset algorithm to obtain a second data, determines whether the second data and the first data are identical, if yes, verifying is successful; otherwise, verifying is failed.

In Embodiment 2, Step 206 specifically includes: the authenticator scans broadcast data, obtains the first client identification in the broadcast data, orderly obtains a first key in the initial pairing key list stored by the authenticator, verifies the first client identification according to the obtained first key, if verifying is successful, generate a second client identification according to the obtained first key which is used for verifying the first client identification successfully, obtains a second key corresponding to the first key, generates a second session key according to the second key, execute Step 303; if all of the first key in the initial pairing key list verify the first client identification unsuccessfully, rescan the broadcast data.

For example, the first client identification clientEid is:
EB59387103AF03A546D62B1364719F61;
the first random number is: EB59387103AF03A5;
the first data is: 46D62B1364719F61;
the first preset field is: "client";
the fourth preset algorithm specifically is: (HMAC-SHA256).

Step 207, the authenticator generates a second authenticator identification according to the first key, obtains the second key corresponding to the first key, generates a second session key according to the second key, notifies that verifying the first client identification is successful, stops scanning and broadcasts broadcast data including the second authenticator identification.

In Embodiment 2, the authenticator generates a second authenticator identification according to the first key specifically is: the authenticator obtains a second preset field stored by the authenticator, concatenates the first client identification and the second preset field orderly, performs operation on the first client identification and the second preset filed via the first key according to the fourth preset algorithm to obtain a fourth data, takes a preset byte of the fourth data as a second authenticator identification.

Specifically, taking the preset byte of the fourth data as a second authenticator identification specifically is: the authenticator takes the first 16 bytes of the fourth data as a second authenticator identification.

Preferably, in Embodiment 2, generating a second session key according to the second key specifically is: the authenticator takes a first preset data stored by the authenticator, performs operation on the first random number and the first preset data via the second key according to the third preset algorithm to obtain a second session key.

Preferably, in Embodiment 2, in Step 207, notifying that verifying the first client identification is successful, stops scanning and broadcasts broadcast data including the second authenticator identification specifically includes: the authenticator sends a request for building Bluetooth connection to the client, builds Bluetooth connection with the client, when the Bluetooth connection is disconnected, the authenticator broadcasts broadcast data including the second authenticator identification.

Preferably, in Embodiment 2, after the authenticator builds Bluetooth connection with the client, the method further includes: the authenticator sends a first unique identification address to the client, receives a second unique identification address sent from the client.

In this case, the broadcast data further includes the first unique identification address and the second unique identification address.

Further preferably, the Bluetooth connection is disconnected specifically is: the authenticator sends a request for disconnecting Bluetooth connection to the client, receives a disconnecting response.

More preferably, the Bluetooth connection is disconnected specifically is: the authenticator receives a request for disconnecting Bluetooth connection sent from the client and returns a disconnecting response to the client.

Preferably, in Embodiment 2, in Step 207, notifying that verifying the first client identification is successful specifically is: the authenticator prompts a user to switch state of the client from broadcasting state to scanning state via a prompting module.

In Embodiment 2, the authenticator broadcasts data according to broadcasting format, specifically, the second authenticator identification is stored in data option of the broadcast data; specifically the second authenticator identification is stored in Service Data option.

For example, the second preset field is: "authenticator", the second authenticator identification authenticatorEid is:
4C7202F777505528DDF467D11BA1CC5F;
the second session key sessionPreKey is:
E93BCD54F6726030DE871348C44C0D857267-96900F8A2C035DF6CE7C11F4 498E.

Step 208, the authenticator receives a request for building Bluetooth connection sent from the client, builds Bluetooth connection with the client, waits for receiving a handshake command sent from the client, when the handshake command is received, execute Step 209.

Preferably, in Embodiment 2, before Step 208, the method specifically includes: the client stops broadcasting, starts scanning broadcast data including the first unique identification address and the second unique identification address, parses the broadcast data obtained by scanning to obtain the second authenticator identification, verifies the second authenticator identification, if verifying is successful, the client sends a request for building Bluetooth connection to the authenticator, builds Bluetooth connection with the authenticator, if verifying is failed, the procedure is end.

In Embodiment 2, Step 208 further includes: the authenticator determines whether the received command is a handshake command, if yes, execute Step 209; otherwise, disconnect Bluetooth connection.

Step 209, the authenticator obtains the client data and the client data digest value in the handshake command, performs operation via the second session key to obtain a second handshake key, verifies the client data via the second handshake key, the client data and the client data digest value, if verifying is successful, the authenticator performs operation on the authenticator data via the second handshake key to obtain an authenticator data digest value, sends a handshake response including the authenticator data and the authenticator data digest value to the client.

Preferably, in Embodiment 2, the authenticator performs operation via the second session key to obtain a second handshake key specifically is: the authenticator obtains a second random number and a second preset data stored by the authenticator, performs operation on the second random number and the second preset data via the second session key according to the third preset algorithm to obtain a second handshake key.

In Embodiment 2, the authenticator obtains the second random number specifically is: the authenticator takes the first random number as the second random number.

Specifically, verifying the client data according to the second handshake key, the client data and the client data digest value specifically is: the authenticator performs operation on the client data via the handshake key according to the fourth preset algorithm to obtain the client data digest value, determines whether the client data digest value obtained by performing operation is identical to the received client data digest value, if yes, verifying is successful, otherwise, verifying is failed.

In Embodiment 2, performing operation on the authenticator data via the second handshake key to obtain an authenticator data digest value specifically is: the authenticator generates a third random number, takes the client version number, the authenticator preset field and the third random number as authenticator data, performs operation on the authenticator data via the second handshake key according to the fourth preset algorithm to obtain an authenticator data digest value.

Specifically, the authenticator data includes: the client version number, the authenticator preset field and the third random number with 16 bytes generated by the authenticator.

For example, the second preset data is ASCII character string "FIDO caBLE v1 handshakeKey";
the second handshake key obtained is:
31454C6E1BB6A9D64790C9B1FD1372F85F5D-C09072B398317FF0760EACE0 09A5;
the third random number is:
935337A931634E9C22C8EEB080827DF3;
the authenticator preset field is:
6361424C45763161757468656E74696361746F7268-656C6C6F;
the authenticator data is:
6361424C45763161757468656E74696361746F72-=68656C6C6F935337A931634
E9C22C8EEB080827DF3;
the authenticator data digest value is:
07808B071C8E69DF1F1BFD13D52F39B8.

Step 210, the authenticator waits for receiving an operating command sent from the client, when the operating command is received, execute Step 211.

Step 211, the authenticator obtains the cipher data in the operating command, performs operation via the second session key to obtain a second encrypting key, decrypts the cipher data via the second encrypting key to obtain an operating data, performs operation corresponding to the operating data to obtain operating result data, performs operation on the operating result data via the second encrypting key to obtain operating result response data, sends an operating response including operating response data to the client.

In Embodiment 2, the authenticator performs operation via the second session key to obtain a second encrypting key specifically is: the authenticator obtains the first random number, the fourth random number in the client data, a third preset data stored by the authenticator, and the third random number, performs operation on the first random number, the fourth random number in the client data, the third random number and the third preset data via the second session key according to the third preset algorithm to obtain a second encrypting key.

Specifically, performing operation on the first random number, the fourth random number in the client data, the third random number and the third preset data via the second session key according to the third preset algorithm to obtain a second encrypting key specifically is: the authenticator performs hash operation on the first random number, the fourth random number in the client data, the third random number to obtain a hash value, performs operation on the hash value and the third preset data via the second session key to obtain a second encrypting key.

Specifically, performing operation on the hash value and the third preset data via the second session key to obtain a second encrypting key specifically is: the authenticator performs operation on the hash value and the third preset data via the second session key according to the third preset algorithm to obtain a second encrypting key.

In Embodiment 2, sending an operating response including operating response data to the client specifically is: the authenticator obtains a count value of a counter, generates a message random number, performs operation on the message random number, data to be encrypted, data head via the second encrypting key to obtain the cipher data, combines the count value, the data head, the message random number and the cipher data to obtain operating result response data, sends the operating result response data to the client.

In Embodiment 2, the authenticator performs operation on the message random number, data to be encrypted, data head via the second encrypting key to obtain the cipher data specifically is: the authenticator performs operation on the message random number, data to be encrypted, data head according to a fifth preset algorithm via the second encrypting key to obtain the cipher data.

Specifically, the message random number specifically is combination of the first random number, the counter value and the preset field counter
the data head specifically is header if sender is the client, the data head header specifically is crud: if sender is the authenticator, the data head header specifically is STAT; in this case, STAT specifically is STAT byte of FIDO BLE transmission protocol;
the fifth preset algorithm specifically is: AES256-GCM;
in this case, the counter is a 24 digit message counter; both the counter of the client and the counter of the authenticator are initialized to be zero, the value of both counters are increased by degrees at the same time after a message is sent.

For example, the counter value is: 0x00 (the client) or 0x01 (the authenticator)
the message head, header=cmd, or header=STAT;
the message random number, messageNonce=nonce (8 bytes)||Sender (1 byte)||Counter (3 bytes);
the cipher data, chiperDATA=AES256-GCM (key=sessionKey, nonce=messageNonce, plaintext=DATA', additionalData=Header, tag-length=128);
if Plaintext=0808080808080808,
messageNonce=EB59387103AF03A501000001,
sessionKey=6D0D200DFB8A55613AF009D804
262CC673A78E1E4293D1E1BF83BC7A54867 ECC,
the cipher data obtained by performing operation is:
chiperdata=44C6F2 7E BC 14 9F 49 EE 88 29 DB 60 E4 70 D0;
the operating response data obtained by combining the counter value, the data head, the message random number and the cipher data specifically is:
0x01+cmd+messagenonce+chiperdata.

In Embodiment 2, if the authenticator can not decrypt the cipher data sent from the client, the authenticator performs disconnecting, meanwhile, if the client can not decrypt the cipher data sent from the authenticator, the client performs disconnecting.

For example, the third preset data is ASCII character string "ADO caBLE v1 sessionKey";
the second encrypting key is:
6D0D20CDFB8A55613AF009D804262CC673A78
E1E4293D1E1BF83BC7A548 67ECC.

Embodiment 3

Figure 4:
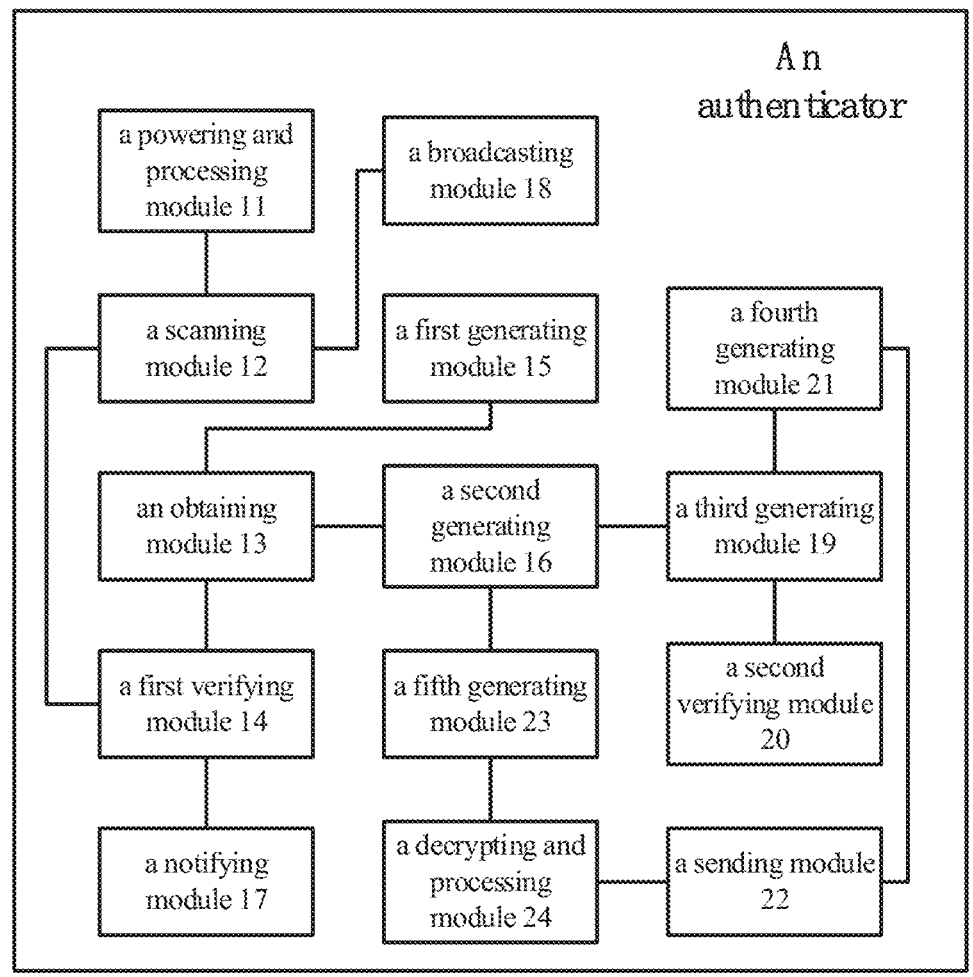
FIG. 4 is a block diagram of an authenticator device provided in Embodiment 3 of the present invention.

Embodiment 3 of the present invention provides an authenticator, as shown in FIG. 4, the authenticator includes:

a powering and processing module 11 configured to power up and enter a connecting mode;

a scanning module 12 configured to scan broadcast data and obtain a first client identification in the broadcast data;

an obtaining module 13 configured to obtain a first key stored by the obtaining module;

a first verifying module 14 configured to verify the first client identification according to a first key;

a first generating module 15 configured to generate a second authenticator identification according to the first key;

the obtaining module 13 further configured to obtain a second key corresponding to the first key;

a second generating module 16 configured to generate a second session key according to the second key;

a notifying module 17 configured to notify that verifying the first client identification is successful;

a broadcasting module 18 configured to stop scanning and broadcast the broadcast data including the second authenticator identification;

the obtaining module 13 further configured to obtain client data and a client data digest value according to a handshake command;

a third generating module 19 configured to perform operation via the second session key to obtain a second handshake key;

a second verifying module 20 configured to verify the client data according to the second handshake key, the client data and the client data digest value;

a fourth generating module 21 configured to perform operation on authenticator data via the second handshake key to obtain an authenticator data digest value;

a sending module 22 configured to send a handshake response including the authenticator data and the authenticator data digest value to the client;

the obtaining module 13 further configured to obtain cipher data in an operating command;

a fifth generating module 23 configured to perform operation via the second session key to obtain a second encrypting key;

a decrypting and processing module 24 configured to decrypt the cipher data via the second encrypting key to obtain operating data, perform corresponding operation according to the operating data to obtain operating result data, perform operation on the operating result data via the second encrypting key to obtain operating response data;

the second sending module 22 further configured to send an operating response including operating response data to the client.

In Embodiment 3, preferably, the authenticator further includes:

a determining and processing module configured to determine activating mode;

a second obtaining and generating module configured to obtain client public key and a client version number in an obtaining extension register command, generate an authenticator key pair, generate a second parameter according to the client public key and authenticator private key of the authenticator key pair;

a second obtaining and generating module further configured to obtain a first preset data stored by the second obtaining and generating module, generate initial pairing key according to the client public key, authenticator public key of the authenticator key pair, the client version number, the first preset data and the second parameter, splits the initial pairing key to obtain a first key and a second key, stores the first key and the second key correspondingly;

the sending module further configured to send an extension register response to the client, the extension register response including the authenticator public key and the client version number.

In Embodiment 3, preferably, the first verifying module 14 specifically is configured to obtain a first preset field stored by the first verifying module, a first random number and a first data in the first client identification, perform operation on the first preset field and the first random number via the first key according to a fourth preset algorithm to obtain a second data, determine whether the second data and the first data are identical.

In Embodiment 3, preferably, the first generating module 15 specifically is configured to obtain a second preset field stored by the first generating module, concatenate the first client identification and the second preset field orderly, perform operation on the first client identification and the second preset field via the first key according to the fourth preset algorithm to obtain a fourth data, take a preset byte in the fourth data as the second authenticator identification.

In Embodiment 3, preferably, the second generating module 16 specifically is configured to obtain a first preset data stored by the second generating module and the first random number in the first client identification, perform operation on the first random number and the first preset data via the second key according to a third preset algorithm to obtain a second session key.

In Embodiment 3, preferably, the third generating module 19 specifically is configured to obtain the second random number and a second preset data stored by the third generating module, perform operation on the second random number and the second preset data via the second session key according to the third preset algorithm to obtain a second handshake key.

In Embodiment 3, preferably, the notifying module 17 specifically configured to build Bluetooth connection with the client, trigger the second broadcasting module when the Bluetooth connection is disconnected.

Preferably, the authenticator further includes a sending and receiving module; the sending and receiving module is configured to send a first unique identification address to the client, receive a second unique identification address sent from the client;

the data broadcasted by the second broadcasting module further includes the first unique identification address and the second unique identification address.

In Embodiment 3, preferably, the notifying module 17 specifically is configured to prompt a user to switch state of the client from broadcast state to scanning state via a prompting module.

According to the present invention, based on Bluetooth connection among devices, the client and the authenticator build Bluetooth pairing connection at application level, perform bidirectional broadcast and scanning authentication in connecting process; an encrypting key is generated according to a negotiated key after successful authentication and connection; data in communicating process is encrypted and transferred in communicating process via the encrypting key which is assures that data in transferring process will not be stolen. By adapting the method provided by the present invention, data security is improved in transferring process and benefit of user is assured.

An authenticator and a communicating method thereof provided by the present disclosure is introduced in detail above. The above description of the embodiments is merely to assist in understanding the method of the present disclosure and its core idea. At the same time, those skilled in the art might make various modifications on specific embodiments or its application scope according to the idea of the present disclosure. Thus, the content of the description above is not limit to the present disclosure.

The invention claimed is:

1. A method for making communication with an authenticator, wherein the method comprises the following Steps:
   S1) powering up, by an authenticator, to enter a connecting mode;
   S2) scanning, by the authenticator, broadcast data, obtaining a first client identification in the broadcast data, obtaining a first key stored in the authenticator, verifying the first client identification according to the first key, if verifying is successful, executing Step S3; if verifying is failed, rescanning the broadcast data;
   S3) generating, by the authenticator, a second authenticator identification according to the first key, obtaining a second key corresponding to the first key, generating a second session key according to the second key, notifying that verifying the first client identification is successful, and stopping scanning and broadcasting the broadcast data comprising the second authenticator identification;
   S4) receiving, by the authenticator, a request for building a Bluetooth connection sent from the client, building the Bluetooth connection with the client, waiting for receiving a handshake command sent from the client, and when the handshake command is received, executing Step 105;
   S5) obtaining, by the authenticator, client data and a client data digest value in the handshake command, obtaining a second handshake key by performing computation via the second session key, verifying the client data according to the second handshake key, the client data and the client data digest value, if verifying is successful, performing computation on authenticator data via the second handshake key to obtain an authenticator data digest value, and sending a handshake response comprising the authenticator data and the authenticator data digest value to the client, then executing Step S6;
   S6) waiting for, by the authenticator, receiving an operating command sent from the client, and when the operating command is received, executing Step S7; and
   S7) obtaining, by the authenticator, cipher data in the operating command, performing computation via the second session key to obtain a second encrypting key, decrypting the cipher data via the second encrypting key to obtain operating data, performing corresponding computation according to the operating data to obtain operating result data, performing computation on the operating result data via the second encrypting key to obtain operating response data, and sending an operating response comprising the operating response data to the client.

2. The method of claim 1, wherein before entering the connecting mode, the method further comprises: determining, by the authenticator, an activating mode, when the activating mode is a first mode, entering the connecting mode; when the activating mode is a second mode, entering a pairing mode; for entering the pairing mode, the method further comprises the following Steps:
   A1) receiving, by the authenticator, an extension register command sent from the client, obtaining a client public key and a client version number in the extension register command, generating an authenticator key pair, and generating a first parameter according to the client public key and the authenticator private key of the authenticator key pair; A2) obtaining, by the authenticator, a first preset data stored in the authenticator, generating an initial pairing key according to the client public key, the authenticator public key of the authenticator key pair, the client version number, the first preset data and the first parameter, splitting the initial pairing key to obtain a first key and a second key, and storing the first key and the second key correspondingly; A3) sending, by the authenticator, an extension register response to the client, in which the extension register response comprises the authenticator public key and the client version number; then entering, by the authenticator, connecting mode.

3. The method of claim 1, wherein verifying the first client identification according to the first key specifically is: obtaining, by the authenticator, a first preset field stored in the authenticator, a first random number and a first data in the first client identification, performing computation on the first preset field and the first random number via the first key according to a fourth preset algorithm to obtain a second data, and determining whether the second data and the first data are identical, if yes, verifying being determined successful; otherwise, verifying being determined failed.

4. The method of claim 1, wherein generating, by the authenticator a second authenticator identification according to the first key specifically is: obtaining, by the authenticator, a second preset field stored in the authenticator, concatenating the first client identification and the second preset field orderly, performing computation on the first client identification and the second preset field via the first key according to the fourth preset algorithm to obtain a fourth data, and taking a preset byte in the fourth data as the second authenticator identification.

5. The method of claim 1, wherein generating a second session key according to the second key specifically is: obtaining, by the authenticator, a first preset data stored in the authenticator and the first random number in the first client identification, and performing computation on the first random number and the first preset data via the second key according to a third preset algorithm to obtain a second session key.

6. The method of claim 1, wherein performing computation via the second session key to obtain a second handshake key specifically is: obtaining, by the authenticator, a second random number and a second preset data stored in the authenticator, and performing computation on the second random number and the second preset data via the second session key according to the third preset algorithm to obtain a second handshake key.

7. The method of claim 1, wherein notifying that verifying the first client identification is successful and stopping scanning and broadcasting the broadcast data comprising the second authenticator identification in Step S3 specifically is: sending, by the authenticator, a request for building a Bluetooth connection to the client, building the Bluetooth connection with the client, and when the Bluetooth connection is disconnected, broadcasting, by the authenticator, the broadcast data comprising the second authenticator identification.

8. The method of claim 7, wherein after building the Bluetooth connection with the client, the method further comprises: sending, by the authenticator, a first unique identification address to the client; and receiving a second unique identification address sent from the client;

the broadcast data comprising the first unique identification address and the second unique identification address.

9. The method of claim 1, wherein in Step S3, notifying that verifying the first client identification is successful specifically comprises: prompting, by the authenticator, a user to switch state of the client from a broadcast state to a scanning state via a module for prompting.

10. An authenticator, wherein said authenticator comprises:
a module for powering and processing configured to power up and enter a connecting mode;
a module for scanning configured to scan broadcast data and obtain a first client identification in the broadcast data;
a module for obtaining configured to obtain a first key stored in the module for obtaining;
a first module for verifying the first client identification according to a first key;
a first module for generating a second authenticator identification according to the first key;
in which the module for obtaining is further configured to obtain a second key corresponding to the first key;
a second module for generating a second session key according to the second key;
a module for notifying that verifying the first client identification is successful;
a module for broadcasting configured to stop scanning and broadcast the broadcast data comprising the second authenticator identification;
in which the module for obtaining is further configured to obtain the client data and a client data digest value according to a handshake command;
a third module for generating configured to perform computation via the second session key to obtain a second handshake key;
a second module for verifying the client data according to the second handshake key, the client data and the client data digest value;
a fourth module for generating configured to perform computation on authenticator data via the second handshake key to obtain the authenticator data digest value;
a module for sending configured to send a handshake response comprising the authenticator data and the authenticator data digest value to the client;
in which the module for obtaining is further configured to obtain cipher data in an operating command;
a fifth module for generating configured to perform computation via the second session key to obtain a second encrypting key; and
a module for decrypting and processing configured to decrypt the cipher data via the second encrypting key to obtain operating data, perform corresponding computation according to the operating data to obtain operating result data, perform computation on the operating result data via the second encrypting key to obtain operating response data;
in which the second module for sending is further configured to send an operating response comprising operating response data to the client.

11. The authenticator of claim 10, wherein the authenticator further comprises:
a module for determining and processing configured to determine an activating mode;
a second module for obtaining and generating configured to obtain the client public key and a client version number in an obtaining extension register command, generate an authenticator key pair, generate a second parameter according to the client public key and authenticator private key of the authenticator key pair;
a second module for obtaining and generating is further configured to obtain a first preset data stored in the second module for obtaining and generating, generate an initial pairing key according to the client public key, the authenticator public key of the authenticator key pair, the client version number, the first preset data and the second parameter, split the initial pairing key to obtain a first key and a second key, and store the first key and the second key correspondingly;
the module for sending is further configured to send an extension register response to the client, in which the extension register response comprises the authenticator public key and the client version number.

12. The authenticator of claim 10, wherein the first module for verifying specifically is configured to obtain a first preset field stored in the first module for verifying, a first random number and a first data in the first client identification, perform computation on the first preset field and the first random number via the first key according to a fourth preset algorithm to obtain second data, and determine whether the second data and the first data are identical to each other.

13. The authenticator of claim 10, wherein the first module for generating specifically is configured to obtain a second preset field stored in the first module for generating, concatenate the first client identification and the second preset field orderly, perform computation on the first client identification and the second preset field via the first key according to the fourth preset algorithm to obtain fourth data, and take a preset byte in the fourth data as the second authenticator identification.

14. The authenticator of claim 10, wherein the second module for generating specifically is configured to obtain a first preset data stored in the second module for generating and the first random number in the first client identification, perform computation on the first random number and the first preset data via the second key according to a third preset algorithm to obtain a second session key.

15. The authenticator of claim 10, wherein the third module for generating specifically is configured to obtain the second random number and a second preset data stored in the third module for generating, and perform computation on the second random number and the second preset data via the second session key according to the third preset algorithm to obtain a second handshake key.

16. The authenticator of claim 10, wherein the module for notifying is specifically configured to build a Bluetooth connection with the client, and trigger the second module for broadcasting when the Bluetooth connection is disconnected.

17. The authenticator of claim 16, wherein the authenticator further comprises a module for sending and receiving; the module for sending and receiving is configured to send a first unique identification address to the client, and receive a second unique identification address sent from the client; and
the data broadcasted by the second module for broadcasting further comprises the first unique identification address and the second unique identification address.

18. The authenticator of claim 10, wherein the module for notifying specifically is configured to prompt a user to switch a state of the client from a broadcast state to a scanning state via a module for prompting.

\* \* \* \* \*